Figure 1:
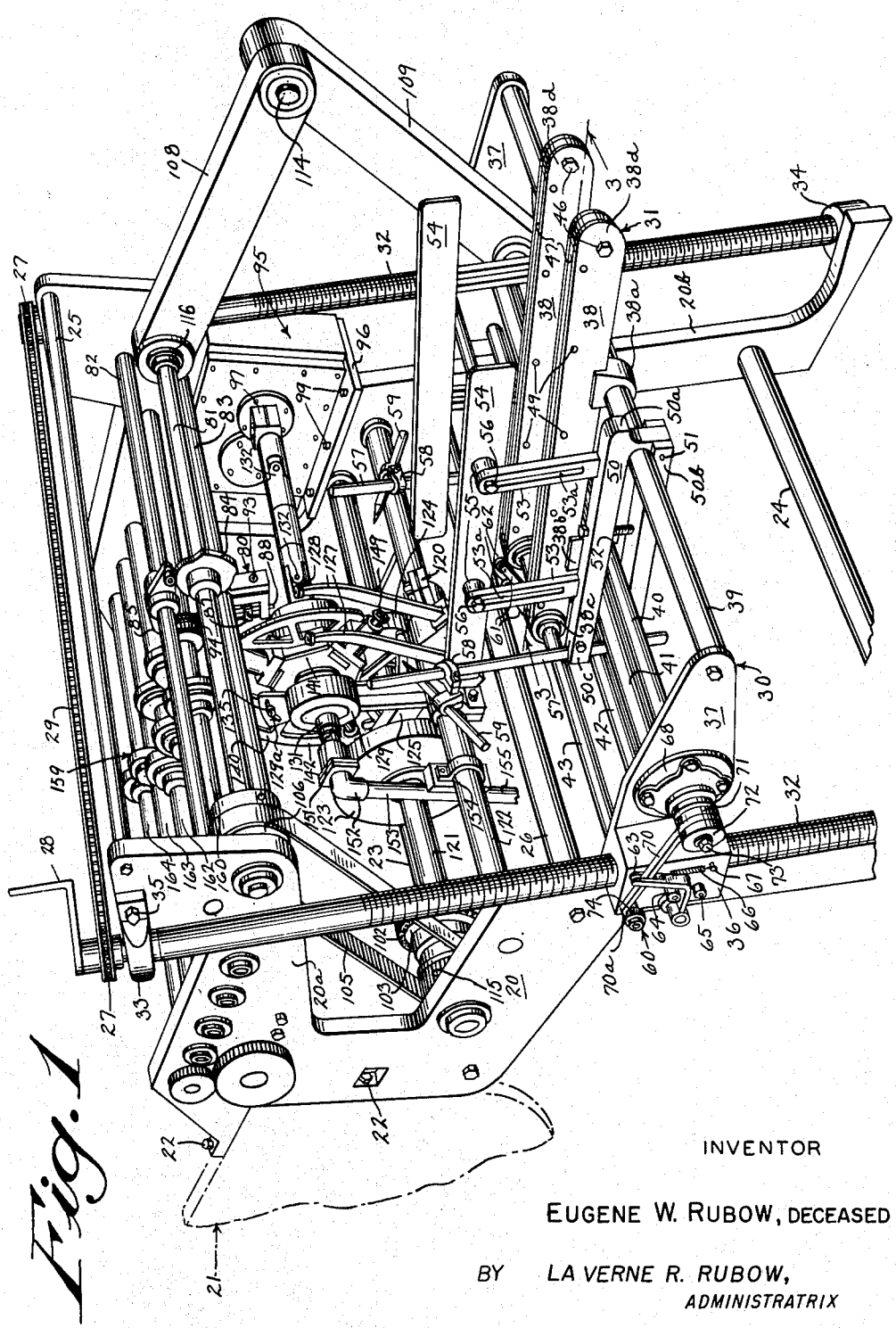

INVENTOR
EUGENE W. RUBOW, DECEASED
BY  LA VERNE R. RUBOW,
ADMINISTRATRIX

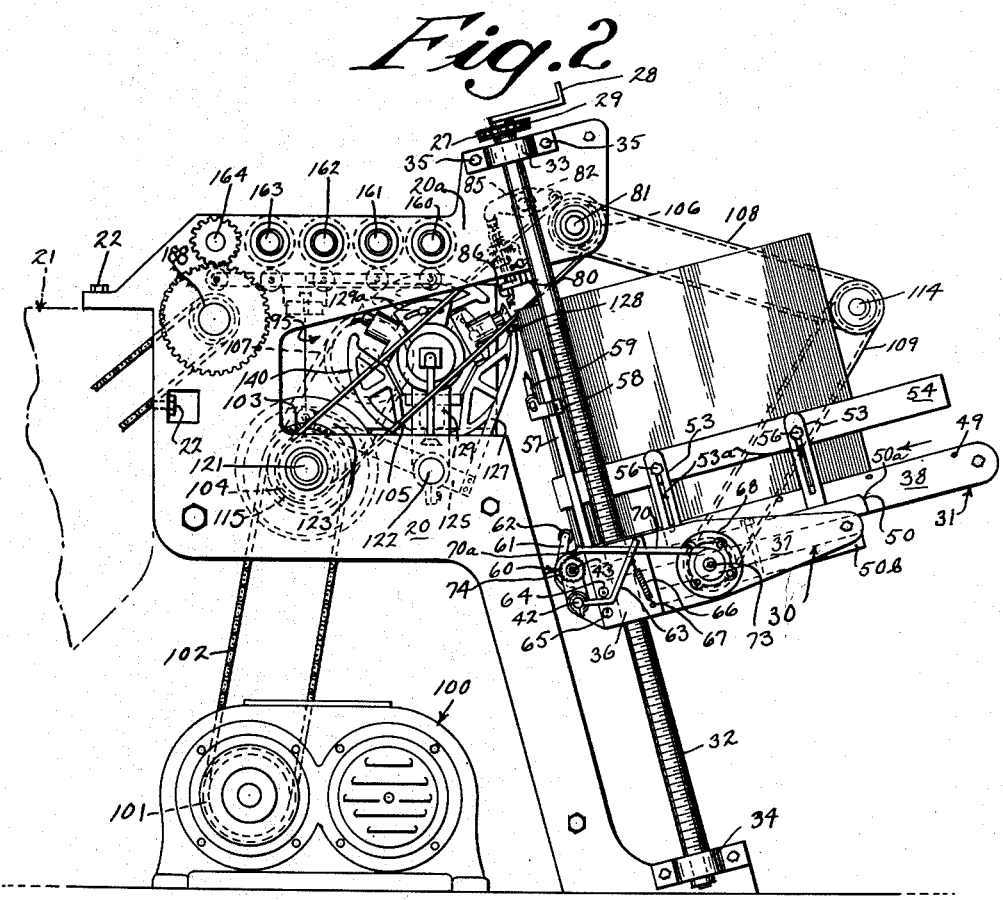

May 25, 1965 E. W. RUBOW 3,185,472
SHEET FEEDING MECHANISM
Filed May 17, 1962 12 Sheets-Sheet 3

INVENTOR

EUGENE W. RUBOW, DECEASED

BY LA VERNE R. RUBOW,
ADMINISTRATRIX

INVENTOR

EUGENE W. RUBOW, DECEASED

BY LA VERNE R. RUBOW,
ADMINISTRATRIX

May 25, 1965   E. W. RUBOW   3,185,472
SHEET FEEDING MECHANISM
Filed May 17, 1962   12 Sheets-Sheet 6

INVENTOR

EUGENE W. RUBOW, DECEASED

BY   LA VERNE R. RUBOW,
ADMINISTRATRIX

May 25, 1965   E. W. RUBOW   3,185,472
SHEET FEEDING MECHANISM
Filed May 17, 1962   12 Sheets-Sheet 7

INVENTOR
EUGENE W. RUBOW, DECEASED
BY  LA VERNE R. RUBOW,
ADMINISTRATRIX

May 25, 1965  E. W. RUBOW  3,185,472
SHEET FEEDING MECHANISM
Filed May 17, 1962  12 Sheets-Sheet 8
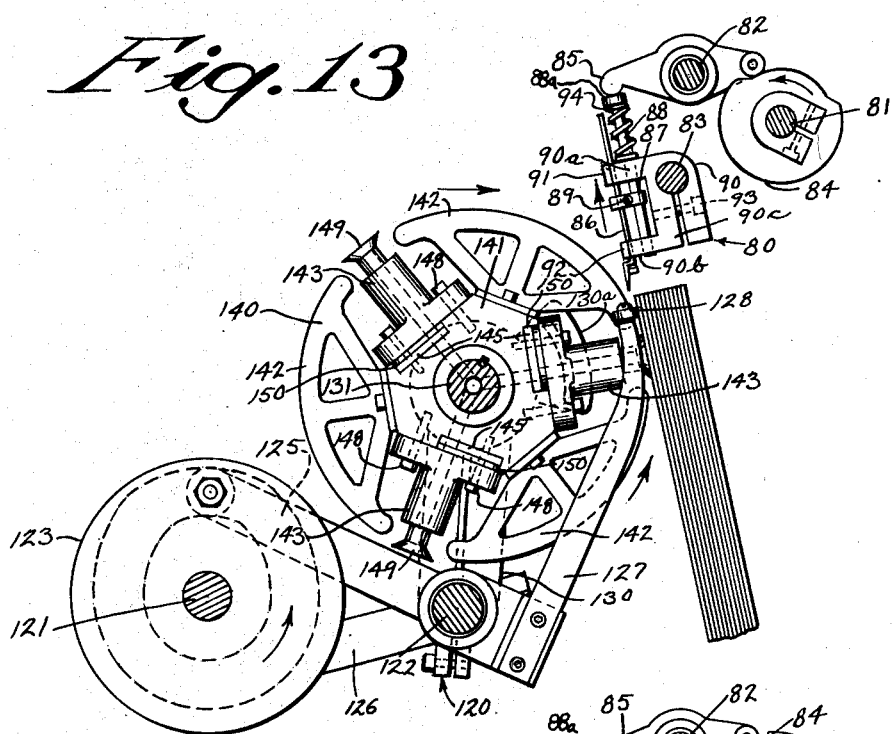
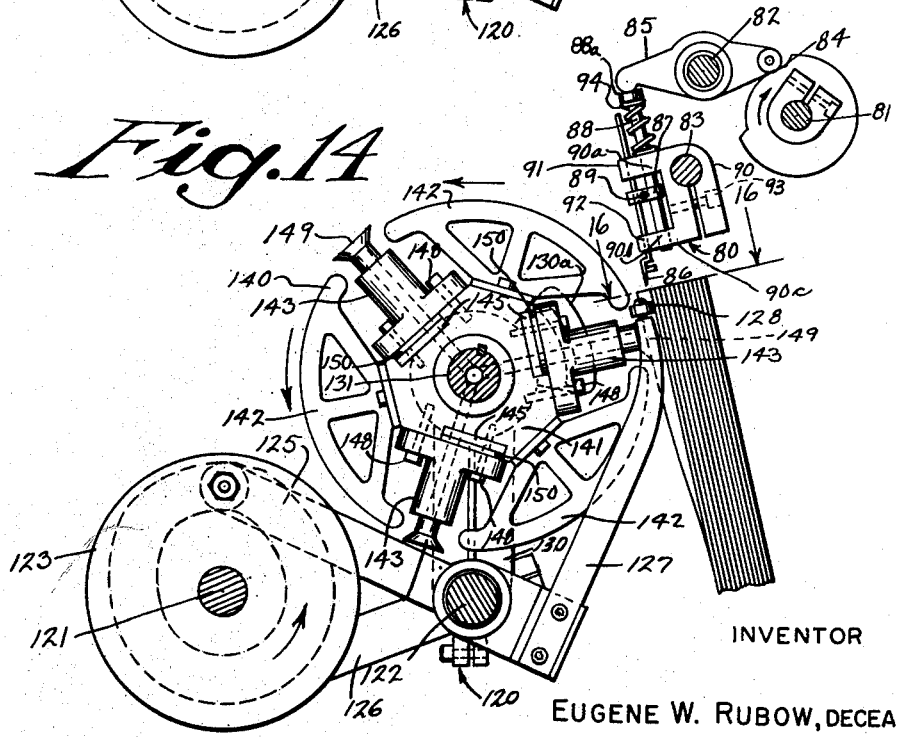
INVENTOR
EUGENE W. RUBOW, DECEASED
BY LA VERNE R. RUBOW,
ADMINISTRATRIX May 25, 1965  E. W. RUBOW  3,185,472
SHEET FEEDING MECHANISM
Filed May 17, 1962  12 Sheets-Sheet 11

INVENTOR.
EUGENE W. RUBOW, DECEASED
BY  LA VERNE R. RUBOW,
ADMINISTRATRIX

May 25, 1965     E. W. RUBOW     3,185,472
SHEET FEEDING MECHANISM
Filed May 17, 1962     12 Sheets-Sheet 12

REMOVAL OF A SINGLE BLANK

| | | | | | | |
|---|---|---|---|---|---|---|
| MOVEMENT OF VACUUM WHEEL | A | B | C | D | E | F |
| MOVEMENT OF HOLDING FINGERS | A | B | C | D | | A |
| MOVEMENT OF SEPARATING FINGER | B | C | D | A | B | |
| VACUUM | ON | | | | OFF | |
| ROTATION OF VACUUM WHEEL | AT REST | | | ROTATE | | |

INVENTOR.
EUGENE W. RUBOW, DECEASED
BY    LA VERNE R. RUBOW,
ADMINISTRATRIX

United States Patent Office 3,185,472
Patented May 25, 1965

3,185,472
SHEET FEEDING MECHANISM
Eugene W. Rubow, deceased, late of Wausau, Wis., by La Verne R. Rubow, special administratrix, Wausau, Wis., assignor to American Can Company, New York, N.Y., a corporation of New Jersey
Filed May 17, 1962, Ser. No. 196,574
18 Claims. (Cl. 271—11)

This invention relates to an improved apparatus for feeding carton blanks to a carton forming system. More particularly, the invention relates to an apparatus in which the carton blanks are removed from a stack one at a time by rotating vacuum means and fed to the infeed of a carton forming system.

In accordance with the present invention the carton blanks in a substantially vertical stack are fed at a controlled rate towards a wheel having vacuum cups thereon. The composite assembly supporting the wheel pivots the wheel toward the stack of carton blanks to enable one of the vacuum cups to contact the adjacent leading carton blank. After the vacuum cup grips the carton blank, the wheel then pivots away from the stack and also revolves in controlled indexing motion which enables the vacuum cup to transfer the blank to the carton forming system. Each succeeding cup in turn withdraws the then leading carton blank from the stack and effects its transfer in like manner to the carton forming system.

More particularly, the rate of feed of the stack of cartons toward the vacuum wheel is controlled by the amount of pressure exerted by the blanks against holding fingers in contact with the leading blank; the rate of feed decreasing as the pressure of the stack increases and conversely the rate of feed increasing as the pressure of the stack decreases. As the vacuum wheel assembly moves toward the stack about a pivot shaft, the leading blank is engaged by a spaced pair of fingers which arrest the forward motion of the stack. The vacuum wheel pauses with one of the vacuum cups a short distance from the adjacent leading blank and then moves forward a slight distance further between the pair of fingers so that one of the vacuum cups contacts the leading carton blank. The vacuum which is being drawn causes the cup to grip the blank to produce a bowing of the carton blank between the holding fingers as the wheel is pivoted away from the stack a slight distance. A separating finger then lowers to seat behind the leading blank in the space defined by the bowed out portion of the leading blank and the next adjacent blank to both separate the upper portion of the leading blank and also to retain the remainder of the stack of carton blanks. The wheel assembly as well as the fingers is then retracted as the vacuum wheel and the accompanying blank rotate upward to transfer the blank to a series of nip rollers, which in turn transfer the blank to the carton forming system.

The primary object of the present invention is to provide a high speed, high efficiency apparatus for separating carton blanks one at a time from blanks stacked on edge, one behind the other.

A further object of the present invention is to provide a carton blank feeding apparatus which can be easily adjusted for accommodating different sized carton blanks to be fed one at a time to a carton forming mechanism.

Another object of the present invention is to provide an apparatus for feeding carton blanks in which the forward movement of the stack of blanks is regulated by means responsive to the pressure exerted by the stack.

Yet another object of the present invention is to provide an apparatus employing a vacuum wheel having vacuum cups thereon in which the vacuum drawn on the vacuum cups is switched on and off by the rotation of the wheel, therefore requiring a minimum of automatic controls.

Figure 4:
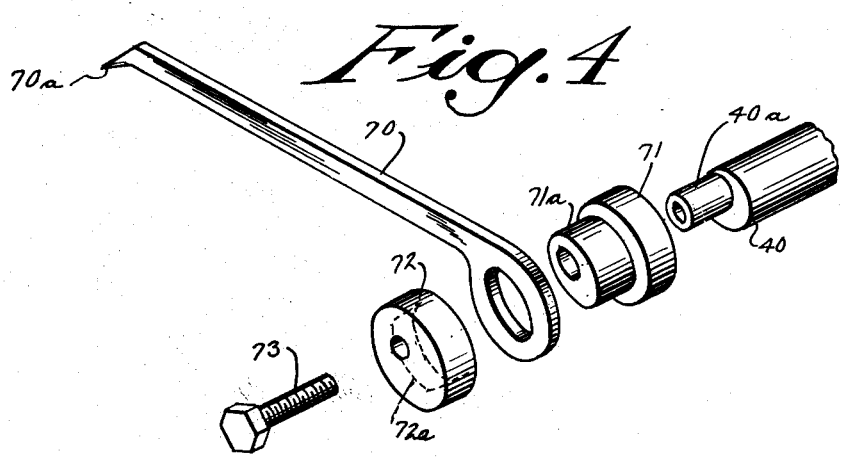
Figure 5:
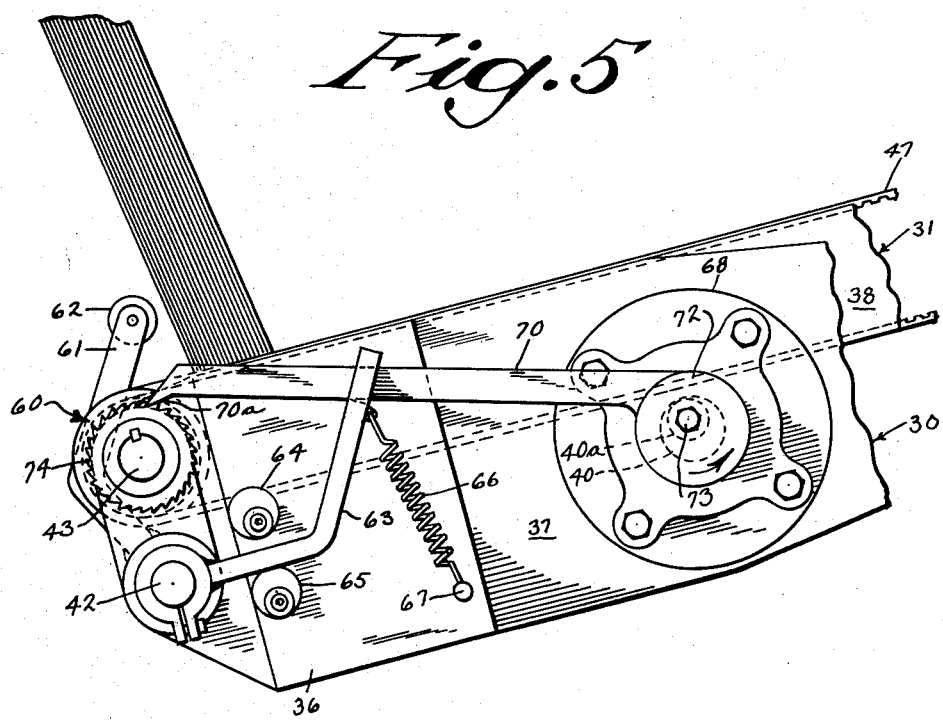
Figure 6:
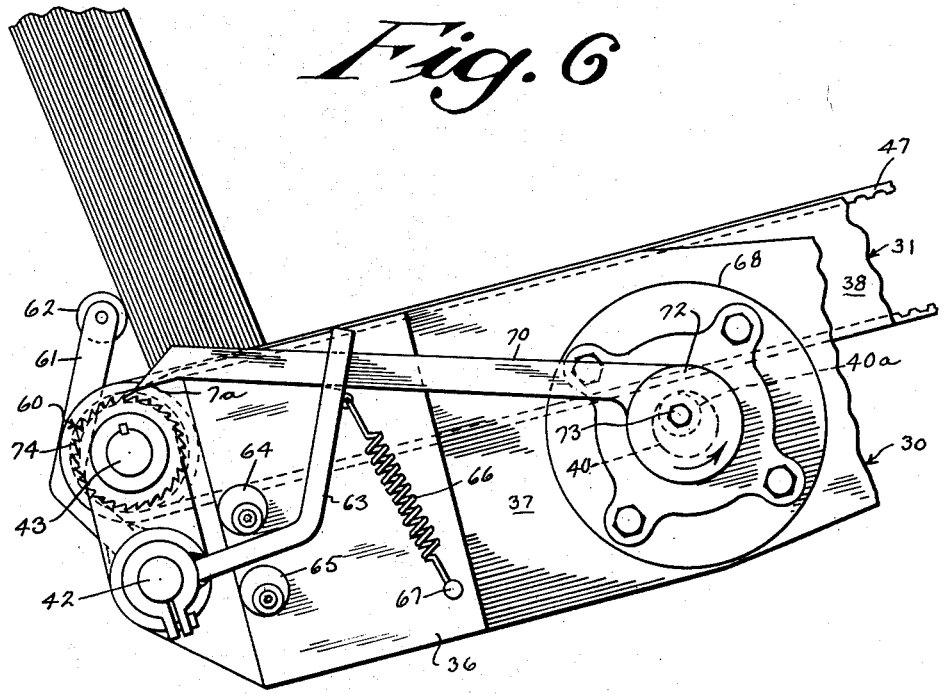
Figure 7:
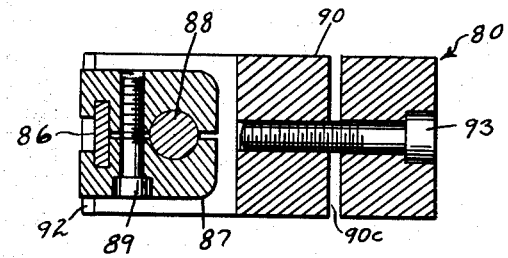
Figure 8:
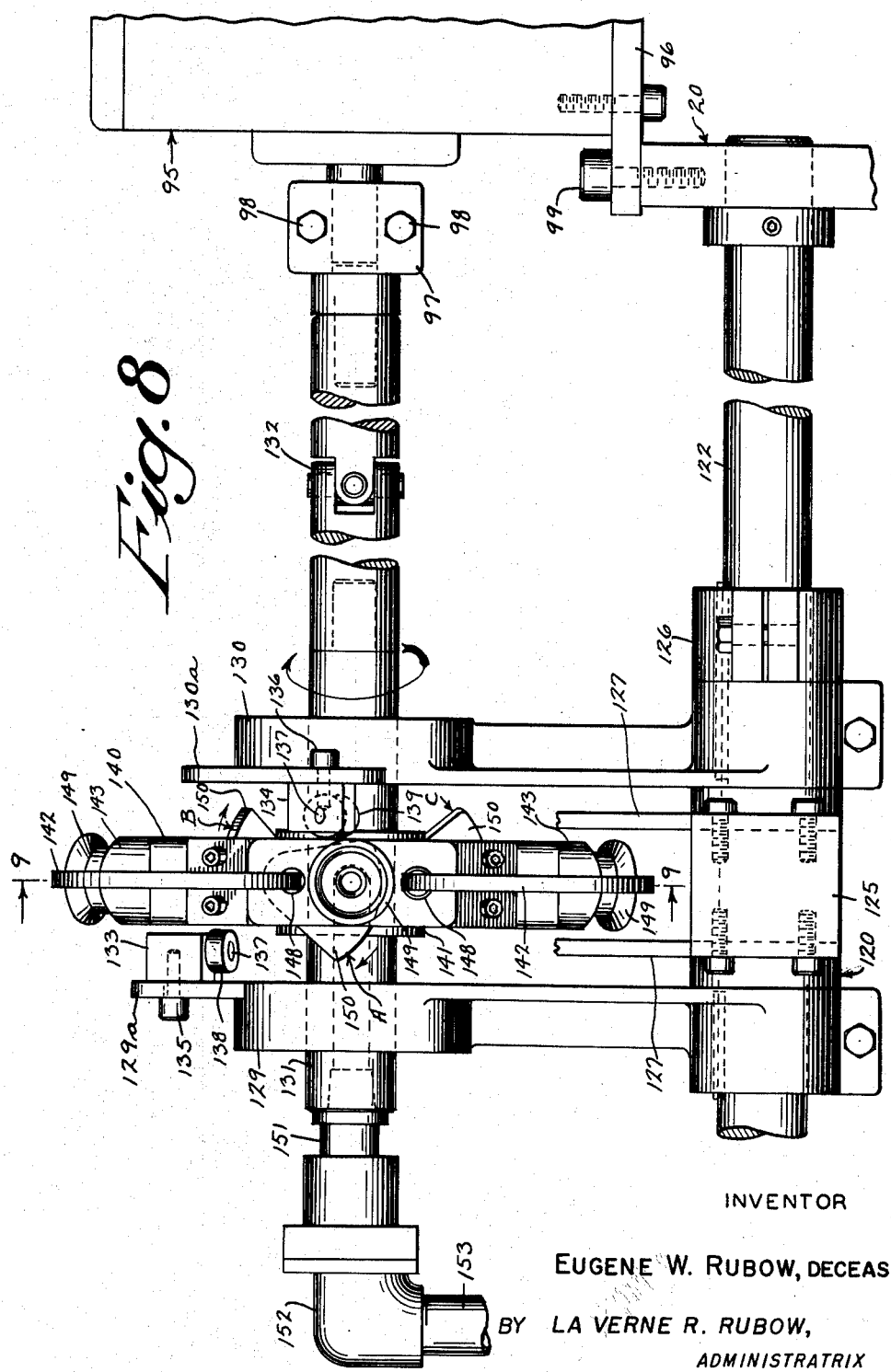
Figure 9:
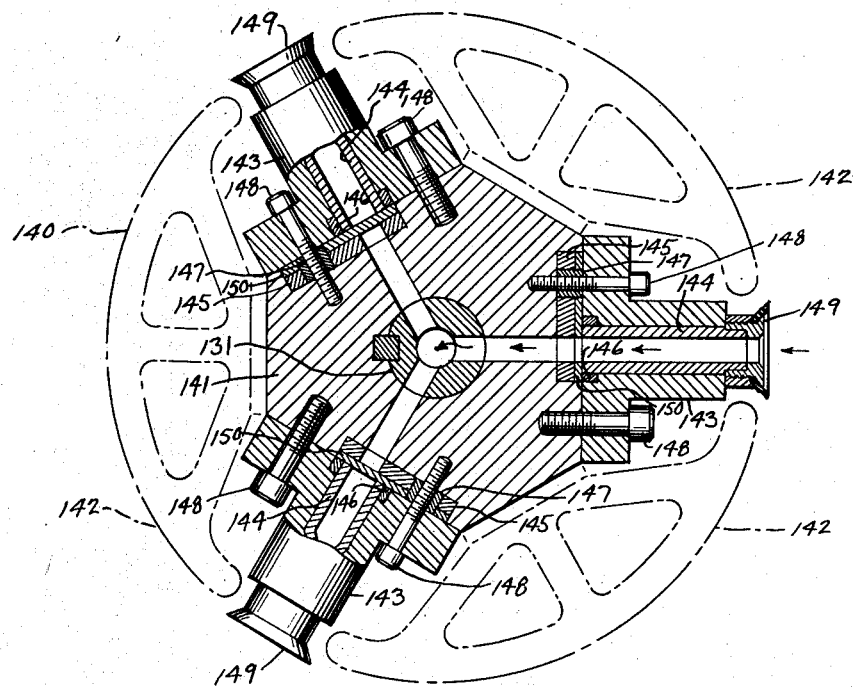
Figure 10:
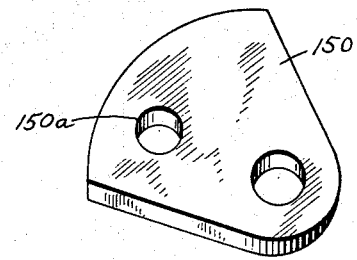
Figure 11:
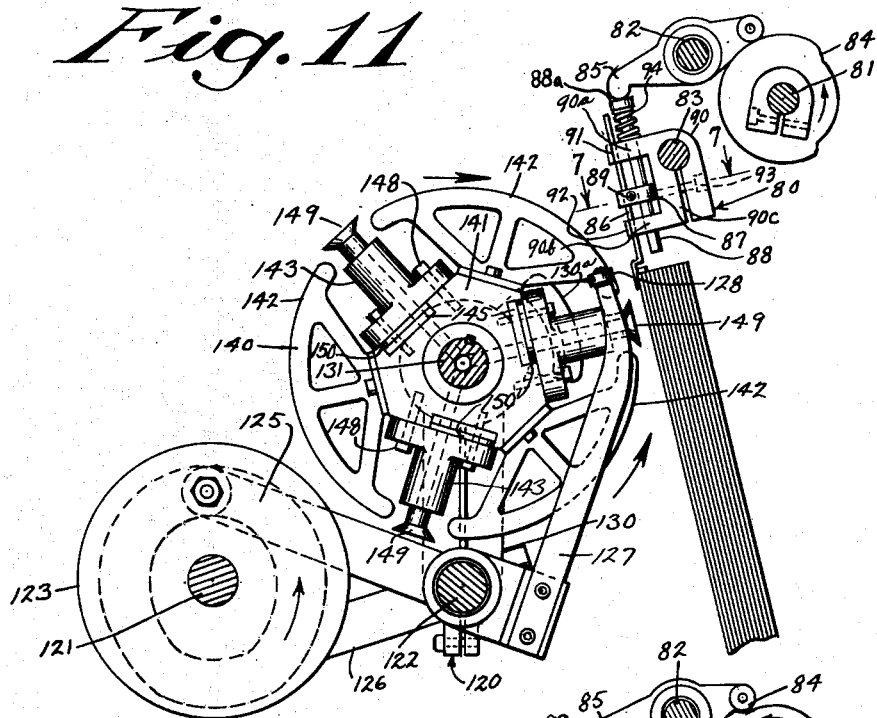
Figure 16:
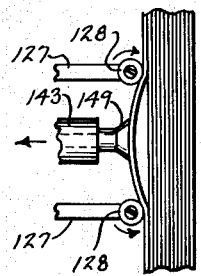
Figure 17:
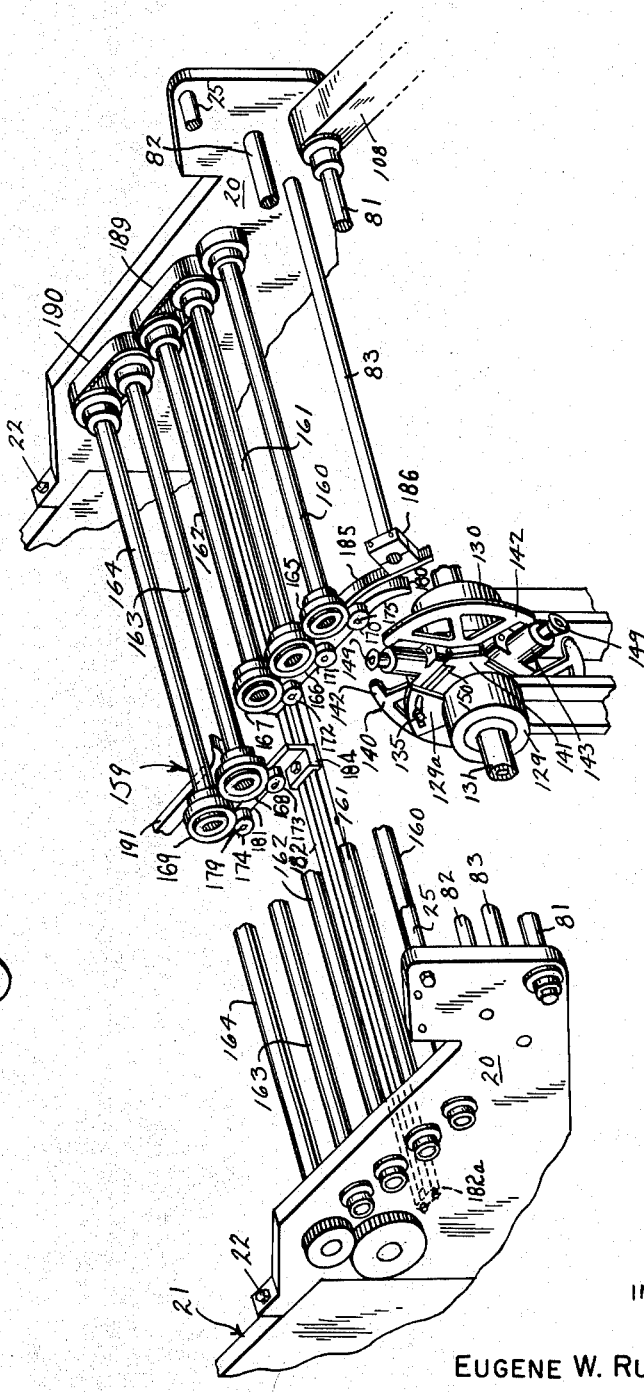
Figure 18:
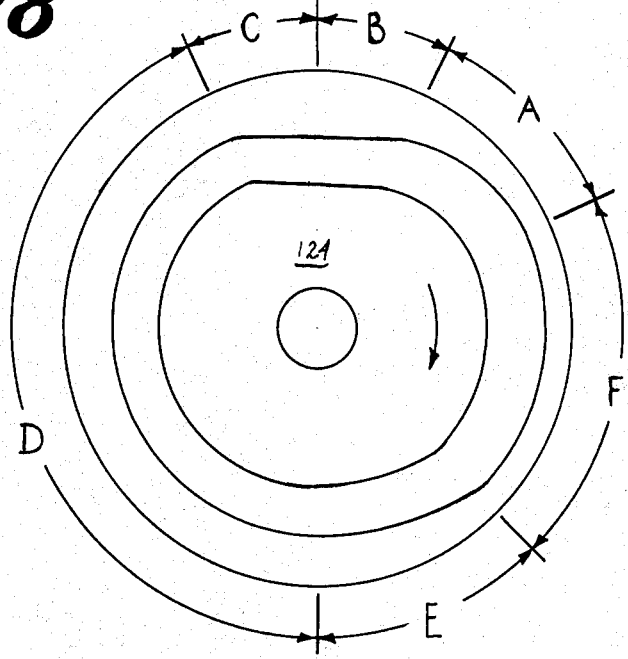
Figure 19:
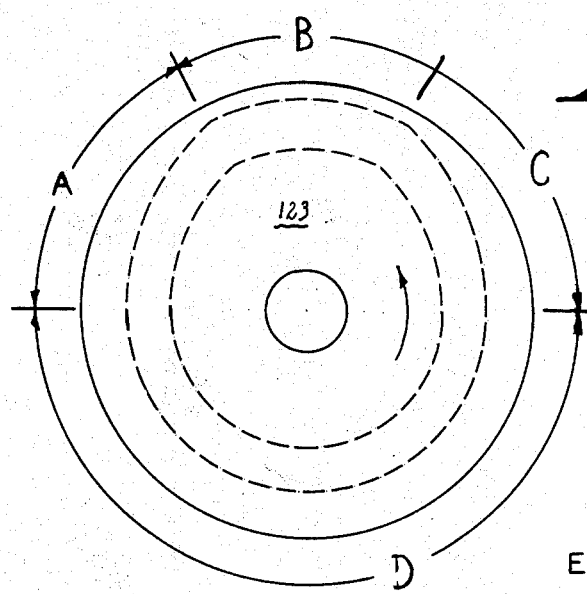
Figures 20, 21:
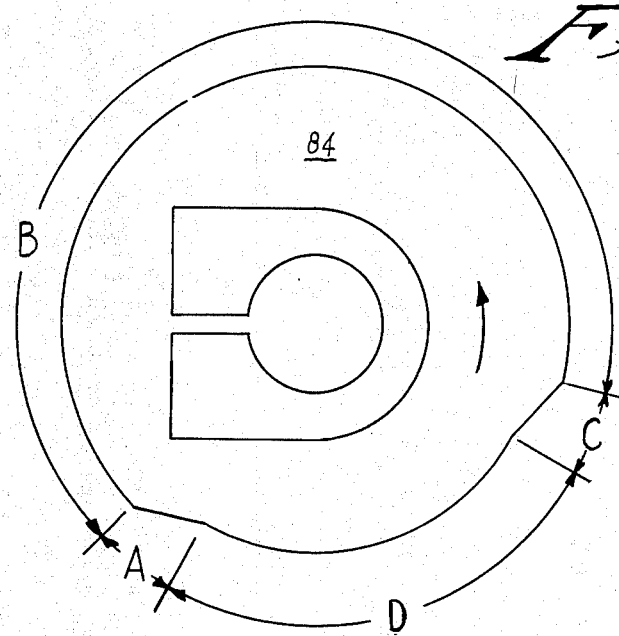

Further details, advantages and objects will be apparent from the following description and drawings wherein:

FIGURE 1 is a perspective view of the apparatus according to the present invention, FIGURE 2 is a side elevation of the apparatus of FIGURE 1, FIGURE 3 is a vertical section of one of the feed carrier rail assemblies taken along line 3—3 of FIGURE 1, FIGURE 4 is an exploded perspective view of the elements constituting the eccentric arrangement for regulating the movement of the stack of carton blanks, FIGURE 5 is an enlarged partial side elevation of the apparatus of FIGURE 1 showing the stack feeding section with the feeding means engaged, FIGURE 6 is an enlarged partial side elevation of the apparatus of FIGURE 1 showing the feeding means, FIGURE 7 is a horizontal section of the separating finger holding means taken along line 7—7 of FIGURE 11, FIGURE 8 is an enlarged plan view of the vacuum wheel and indexing means of the apparatus according to the present invention, FIGURE 9 is a vertical section of the vacuum wheel taken along line 9—9 of FIGURE 8, FIGURE 10 is a perspective view of the vacuum regulating valve, FIGURES 11–15 are enlarged partial side elevations showing the parts of the apparatus in different positions to illustrate the several steps performed in the removal of a single blank from the stack of carton blanks, FIGURE 16 is a fractional plan view of the separation of the leading carton blank taken along line 16—16 of FIGURE 14, FIGURE 17 is a partial perspective view showing the nip roll transfer section of FIGURE 1 in greater detail, FIGURE 18 is a side view of the two edge positive action cam which controls the movement of the vacuum wheel, FIGURE 19 is a side view of the two edge positive action cam which controls the movement of the holding fingers, FIGURE 20 is a side view of the cam which controls the movement of the separating finger, and FIGURE 21 is a time diagram of the motions of the apparatus according to the present invention.

In systems for feeding carton blanks, forming cartons, filling and closing the cartons, the operations must be performed in timed sequence and only one blank can be utilized at a time. If two blanks are fed in together, the system may jam at any one of a number of stages. In order to prevent such jamming which may involve costly delays, it is important to feed one blank at a time to the carton forming system to insure the correct sequence of folding, filling and closing. With the attachment herein disclosed and described, substantially increased output, speed and reliability have been attained.

Referring first to FIGURE 1, there is shown a carton blank feeding attachment suitable for use in conjunction with a variety of carton and tray forming machines. The attachment comprises a feed table 30, means 31 located on said table for moving a stack of carton blanks forward, means 60 for regulating the movement in controlled numbers, a wheel 140 having vacuum cups 149 mounted thereon, means for moving the vacuum wheel 140 forward to enable one of the vacuum cups 149 to contact the leading carton blank and apply a suction thereto, means 80 for separating the leading carton blank from and retaining the rest of the stack and means 95 for indexing the rotation of the vacuum wheel to remove the leading blank and means 159 for transferring it into the carton forming system 21.

In the present invention illustrated in FIGURE 1 the various elements which comprise the blank feeding attachment are suspended from or mounted on various shafts connected between side frames 20, which include upper portions 20a and leg portions 20b, and which are connected to the carton forming system designated generally at 21 by studs 22. The side frames are connected in spaced relationship by a number of the shafts including separating shafts 23 and 24, 25, 26 and 82. As is readily apparent, the construction and configuration of the side frames 20 can be modified so that the attachment can be employed with different carton forming systems.

The carton blanks are initially placed as shown in FIGURE 2 on a feed table designated generally at 30, adjustably connected to the side frames 20 by means of feed table elevator screws 32 the ends of which pass through mounting brackets 33, 34 attached to side frame portions 20a, 20b, respectively, by studs 35. Adjusting sprockets 27 mounted on the upper ends of elevator screws 32 and connected by adjusting chain 29 enable the table 30 to be elevated or depressed by rotation of crank 28. The feed table 30 comprises feed table elevating nuts 36, feed table mounting brackets 37 connected to said nuts, and a series of parallel shafts mounted between the nuts 36 and brackets 37. A pair of feed carrier rails 38 are mounted on two of the shafts, namely carrier rail mounting shafts 39 and 41, by passing the shafts through portions 38a and 38b, respectively, of the feed carrier rails 38. Two pairs of gears, 44 and 45, shown in FIGURE 3, are mounted between the vertical sides of feed carrier rails 38 at portions 38c and 38d, respectively. Gears 44 are keyed in and driven by lower holding finger shaft 43, while gears 45 turn freely about studs 46. Feed table carrier belts 47 are threaded over sprockets 44 and 45 and are supported by belt supports 48 mounted by screws 49 to carrier rails 38 as shown in detail in FIGURE 3.

Mounted outwardly of the feed carrier rails 38 are pile side guide mountings 50 comprising upper portions 50a and lower portions 50b which are connected together and pivot about pins 51. The upper and lower portions, namely 50a and 50b are held firmly in place against adjacent surfaces of feed carrier mounting shafts 39 and 41 by connecting studs 52. Extending upwardly from mountings 50 are pile side guide brackets 53 having channels 53a therein. Pile side guides 54 which contact the side edges of the carton blanks are spaced from the brackets 53 by bushings 55 and adjustably connected to move vertically in the channels 53a by studs 56. As is readily apparent some or all of the elements including feed carrier rails 38, pile side guide mountings 50 and pile side guides 54 can be relocated to accommodate carton blanks of varying sizes.

The carton blanks reaching the inner ends of the feed carrier rails 38 are somewhat restrained in their progress by holding rods 59 which are adjustably mounted on rod mounts 57 by clamps 58. The lower ends of rod mounts 57 are adjustably engaged in holes located in end portions 50c of pile side guide mountings 50. The rods can be rotated and elevated or depressed as desired to contact the edges of the incoming blanks to relieve some of the forward pressure exerted by the stack of blanks.

The advance of the stack of carton blanks is controlled by means designated generally as 60, which is responsive to the pressure exerted by the stack of cartons. As the bottom of the stack advances the carton blanks exert pressure against the lower holding fingers 61 as shown in FIGURES 1, 2, 5 and 6 fixedly attached to holding finger shaft 42. Rollers 62 mounted on the end of the fingers 61 actually receive the pressure from the stack of blanks and transfer the pressure in the form of motion via the fingers 61 to the pile holding finger shaft 42 which is in turn rotated. The rotation causes the channeled guide 63 which is fixedly connected to the end of the shaft 42 externally of the feed table elevating nut 36 to rotate counter clockwise. The channeled guide 63 rides between two eccentric bearing elements 64, 65 and is connected adjacent the channeled end by a spring 66 to feed table mounting bracket 37 by stud 67. Any movement of the guide in the counter clockwise direction is resisted by the tension of the spring.

A drive shaft 40 mounted in the feed table mounting brackets 37 by mounting collars 68, and turned by means described hereinafter, supplies the movement which is in turn communicated to the sprockets 44 and hence carrier belts 47. The shaft rides in bearings 69 located within the mounting collars 68. A feed arm 70 is mounted on the eccentric end of feed belt drive shaft 40 and rests in the lower extremity of the channel in channeled guide 63 forming a sliding pivot thereon. The particular eccentric arrangement is shown in an exploded view in FIGURE 4. A reamed feed belt eccentric 71 fits over and rides on end 40a of shaft 40 which end is located off center with respect to the main body of the shaft and which therefore imparts eccentric motion to elements mounted thereon. The feed arm 70 rides on the smaller diametered portion 71a of eccentric 71 and is held in place by eccentric locking collar 72 which is bored at 72a to receive the extending end of portion 71a of the eccentric 71. A stud 73 which is fastened into end 40a holds the eccentric arrangement against the end of the shaft 40. The particular eccentric arrangement imparts a lifting and pushing motion to the end 70a of feed arm 70 as shown in FIGURE 5. A ratchet gear 74 is keyed to the end of the feed carrier belt drive shaft 43 and when rotated imparts circular motion to the shaft. As the end of feed arm 70 engages one of the teeth of the ratchet gear 74 as shown in FIGURE 5 and moves forward, shaft 43 is rotated, in turn imparting circular motion to sprockets 44 which drive belts 47, moving the stack of carton blanks forward. The blanks in turn exert pressure on lower holding fingers 61 moving them backward and rotating shaft 42 and channeled guide 63. As the guide 63 rotates, it lifts feed arm 70 disengaging the end 69a of the arm as shown in FIGURE 6 hence stopping movement of the belts 47. As soon as some of the blanks are removed from the forward portion of the stack, the pressure on the lower holding fingers 61 is lessened causing the spring 66 to retract the guide 63. The retraction of the spring in turn allows the feed arm 70 to drop so that the end 69a again engages one of the teeth in the ratchet gear 74, again as shown in FIGURE 5, moving the stack of blanks forward. The regulating procedure continues as long as carton blanks are placed on the belts 47.

Once the stack of blanks is advanced forward so that the leading blank contacts the rollers 62 on the lower holding fingers 61 the blanks are in position to be removed one at a time from the stack and transferred overhead by the nip roller transfer section, designated generally as 159 (FIGURE 17), to the carton forming system 21. The blanks are separated and withdrawn by means designated generally as 80 and 120, respectively, which coact to effectuate the removal of one blank at a time. The particular sequence of operations of the separation and withdrawal means is shown in FIGURES 11–16.

The separating means designated generally as 80 shown in FIGURE 11 is mounted on a series of shafts namely separating finger cam shaft 81, rocker arm shaft or separating shaft 82 and finger mounting shaft 83, and comprises a separating finger cam 84 (see FIGURE 20) keyed to and riding on separating finger cam shaft 81, separating finger rocker arm 85 mounted on rocker arm shaft 82, and the separating finger 86 and finger holding means. FIGURE 7 shows a sectional view of the separating finger holding means. The separating finger 86 is mounted to ride in the separating finger clamp 87 which is securely tightened about the separating finger and separating finger push rod 88 by means of a stud 89. The push rod 88 rides in bushings (not shown) inserted in holes in the upper and lower extending portions 90a and 90b of separating finger block 90. Retaining plates 91 and 92 are mounted on the vertical surfaces of the upper and lower portions of block 90 to enclose the bushing containing vertical channels formed in the portions and provide controlled movement of the separating finger 86. The separating finger block 90 is mounted on the finger mounting shaft 83 and secured in fixed position thereto by means of a screw 93 which pulls the portions adjacent the channel 90c together. A spring 94 inserted between the head 88a of push rod 88 and the upper surface of portion 90a of finger block 90 resists any downward pressure exerted on the head of the push rod and tends to maintain the separating finger 86 in a raised position.

The removal means designated generally as 120 is mounted on a series of shafts, namely indexing unit drive shaft 121 and vacuum wheel pivot shaft 122 which in turn are mounted intermediate the side frames 20. A pair of two edge positive action cams, namely holding finger cam 123 and vacuum wheel cam 124 (see FIGURES 18 and 19) are keyed on and rotate with shaft 121. The cams rotate in the same direction but are shown in FIGURES 18 and 19 with motion indicated to be opposite directions. In order to show the configuration of the cams, it was necessary to show a left side view of cam 124 and a right side view of cam 123. A pair of arms, namely holding finger arm 125 and vacuum wheel arm 126 shown in FIGURE 8 are mounted on shaft 122, each of the arms being so located on shaft 122 that the end of the arm is immediately adjacent one of the cams. The end of each of the arms 125, 126 adjacent the cams has a cam following adjusting eccentric, an eccentric locking washer, and a cam follower mounted thereon with the cam followers traveling the path defined by the configuration of the respective cams 123, 124. Mounted on the other end of the holding finger arm 125 are upper holding fingers 127 having rollers 128 at the upper ends thereof. A pair of vacuum wheel mounting brackets 129, 130 extend essentially vertically upward from the vacuum wheel pivot shaft 122 and support the vacuum wheel shaft 131. Each of the mounting brackets 129, 130 has a channeled projecting flange 129a and 130a, respectively, of arcual shape extending therefrom. Valve deflecting blocks 133, 134 mounted by studs 135, 136 extend inwardly of the respective channeled flanges 129a and 130a of the mounting brackets. Each deflection block has a deflecting roller 138, 139, respectively, attached thereto and inwardly thereof by a pin 137 aligned with a radius of the flanged portion extending from the center of the vacuum wheel shaft 131. The rollers 138, 139 function to control the vacuum drawn on the vacuum cups by displacing the valves 150 from one side to the other as valves 150 contact them during rotation of the vacuum wheel. The particular point of controlling the application of the vacuum to the cups may be shifted in position by adjusting the location of the respective deflection blocks 133, 134.

The rotation of the vacuum wheel 140 is controlled by a standard parallel shaft indexing unit 95 (Model No. P 3H28-270, Type 1 manufactured by Commercial Cam and Machine Co., Chicago, Illinois) which rests on a mounting bracket 96 attached by studs 99 to the side frame 20. A clamp 97 held by bolts 98 connects the shaft extending from the unit to a pair of universal joints 132. The universal joints 132 are in turn connected to the vacuum wheel shaft 131, thus controlling the rotation of the wheel as the carton blanks are withdrawn from the stack and transferred to the carton forming system. It is understood that any other suitable linkage providing the desired rotating motion could be substituted for the universal joints.

The vacuum wheel 140 itself, which is shown in detail in FIGURES 8 and 9, comprises a hub 141, vacuum wheel guides 142, mounting blocks 143, vacuum cup holders 144, valve plates 145, valve bushings 146, valve plate pivot collars 147, studs 148 and vacuum cups 149. The vacuum which is drawn in towards the center of the hub 141 as shown by the arrows is controlled by the valves 150 (see FIGURE 10). When closed, the valves 150 are opened by pivoting about pivot collars 147 so that the holes 150a in the valves 150 coincide with the respective holes in the hub 141, valve bushings 146 and vacuum cup holders 144. The opening and closing of the valves during operation will be discussed more fully hereinafter. A fixed coupling connection 151 is journalled to the interior of the vacuum wheel shaft 131 and connected to an elbow 152. A short piece of rigid tubing 153 which is mounted on vacuum wheel pivot shaft 122 by clamping means 154 connects the elbow 152 and a flexible tubing 155 (see FIGURE 1) which leads to a vacuum source not shown.

After the leading carton blank is withdrawn from the remainder of the stack by the rotation of the vacuum wheel 140 it passes into a nip roller transfer section shown in FIGURES 1, 2 and 17 and designated generally as 159. The section comprises a series of driven upper nip roller shafts 160–164 mounted in the side frames 20 and having nip rollers 165–169 keyed thereon to rotate with the shafts and cooperate with lower nip rollers 170–174 rotating free on stub shafts 175–179 which in turn are mounted on lower nip roller bracket 180 and center lower nip roller bracket 181 respectively. Brackets 180 and 181 attached to blocks 183 and 184 are mounted on nip wheel mounting bar 182 which is in turn mounted in side frames 20 and whose end 182a is shown in phantom in FIGURE 17 below the ends of the upper nip roll shafts. As is obvious the size of the nip between the upper nip rollers 165–169 and the lower nip rollers 170–174 can be adjusted to accommodate carton blanks of varying caliper. For ease of description of the elements comprising the section as well as the operation thereof, a portion of the section in FIGURE 17 has been removed. It is understood that an identical but opposite set of nip rollers 165–167 and 170–172 are mounted a similar distance on the other side of the vacuum wheel and perform essentially the same as those shown.

When the vacuum wheel 140 rotates, the blanks are carried upward and are guided adjacent each of the edges parallel to the plane of the wheel by elements mounted externally of the nip rollers. These elements, which have been omitted in FIGURES 1 and 2 to permit depiction of elements normally covered by them, are shown in FIGURE 17. A nip for each of the aforementioned edges is formed by a guide bar 185 attached to a guide block 186 adjustably mounted on finger mounting shaft 83 and the downwardly extending end of lower nip roller bracket 180. These nips assure the proper passage of the carton blanks into the nip formed by the nip rollers. The driven upper nip rollers force the carton blank between the successive nips formed by the pairs of cooperating upper and lower rollers and hence into the infeed means of the carton forming system. The transition from the nip roller section to the infeed means is assisted by hold down bars 191.

FIGURE 2 particularly shows the drive arrangement employed for synchronizing the various timed means employed in the attachment. A drive means 100 shown in FIGURE 2 supplies motion to all of the moving parts except the nip roller section. From drive means 100 having a sprocket 101 mounted thereon, the motion is transmitted via chain 102 to a sprocket 103 keyed to and rotating an indexing unit drive shaft 121. The rotation of the drive shaft 121 causes rotation of holding finger cam 123, vacuum wheel cam 124, indexing unit drive shaft gear 115, and indexing sprocket 104. A belt 105 is threaded about gear 115 on one end of its path of travel and about separating cam gear 106 mounted on separating finger cam shaft 81. The rotation of the shaft 81 controls the motion of rocker arm 85 which rides on the periphery of the separating finger cam 84, and also rotates a pulley shown in FIGURE 1 generally designated as 116 mounted thereon. Covers 108 and 109 shown in FIGURE 1 conceal a belt-pulley arrangement which transmits motion to feed belt drive shaft 40. Stub shaft 114 mounts two pulleys in side by side relationship to receive the belts extending from the pulleys mounted on shafts 40 and 81 respectively.

Indexing sprocket 104 in turn drives the conventional indexing means 95 via indexing chain 107. The upper nip roll shafts 160–164 are driven off of a drive shaft 188 which in turn is chain driven from a power source remote from the attachment. Drive shaft 188 is geared to and rotates upper nip roll shaft 164 as shown in FIGURE 2. The remaining upper nip roll shafts 160–163 are driven by a series of pulleys and belts located at alternating ends of the shafts as shown at 189 and 190 in FIGURE 17.

The sequence of operation of the attachment, as a single blank is first separated, then removed from the stack and finally transferred overhead to the carton forming system, will be readily understood by referring to FIGURES 8–16 and the description as set forth hereinafter.

Figure 12:
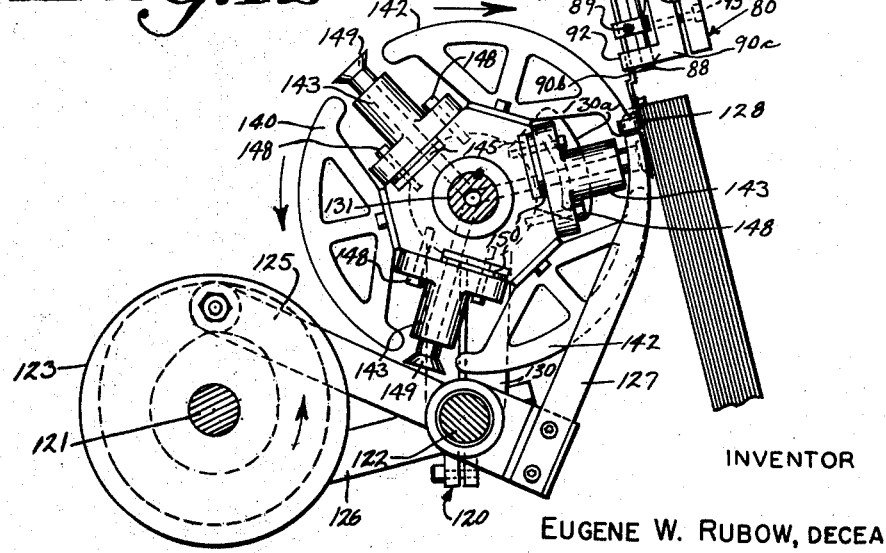
Figure 15:
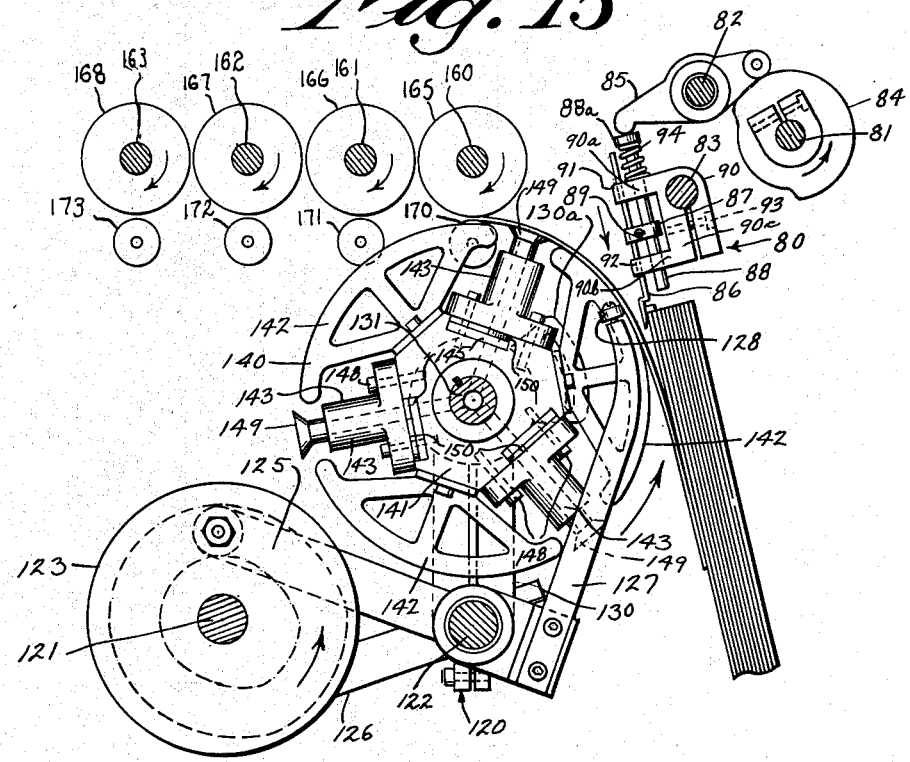

In FIGURE 11 the vacuum wheel 140 has just transferred a blank overhead and has ceased rotation about vacuum wheel shaft 131 with one of the vacuum cup holders 144 positioned adjacent the carton stack at an angle of essentially 90° to the stack. The valve 150 in the vacuum cup mounting adjacent the carton stack is switched to the open position just prior to the cessation of rotation so that a vacuum is being drawn while the wheel is at rest. At this time the upper pile holding fingers 127 are withdrawn from contact with the leading carton blank and the stack held back by separating finger 86 as shown in FIGURE 11. After cessation of rotation the whole vacuum wheel assembly mounted on the vacuum wheel mounting brackets 129 and 130 starts to pivot toward the carton blanks, as shown in FIGURE 11, about vacuum wheel pivot shaft 122. The vacuum cup 149 adjacent the leading carton blank is moved to a rest position about an eighth of an inch from the blank (see FIGURE 12) pauses, and then quickly moves in and contacts the leading blank as shown in FIGURE 13. Simultaneous with the forward motion of the wheel assembly, upper holding fingers 127 contact the leading blank as shown in FIGURE 12. As soon as the holding fingers 127 contact the stack, the separating finger 86 starts to retract to the upper position shown in FIGURE 13. The overhead separating finger 86 is retracted by the action of spring 94 which raises the push rod 88 mounting the finger 86. Concurrently with the retraction of the separating finger 86, the cup on the vacuum wheel 140 grasps the leading carton blank and the wheel moves away from the stack of carton blanks and pauses (see FIGURE 14). At this point the forward movement of the upper portion of the stack is now prevented only by the restraining action of the holding fingers 127. Once the vacuum cup 149 grasps the leading blank and the vacuum wheel 140 has pivoted away from the stack, the leading blank is drawn into a bowed shape between the rollers 128 on the upper ends of the two upper holding fingers 127 as shown in FIGURE 14. FIGURE 16 which is a top view of the stack shows in greater detail the bowed configuration of the leading blank in the area between the rollers 128 on the ends of the holding fingers. While the wheel 140 momentarily pauses, the separating finger 86 then moves down to seat in the bowed area between the leading blank and the next successive blank. After pausing, the vacuum wheel assembly continues to pivot away from the stack. Simultaneously, upper holding fingers 127 retract, putting the full forward pressure of the upper portion of the stack against the separating finger 86 and relieving the pressure of the stack against the leading blank.

The leading carton blank which is now free of restraint by the holding fingers can be transferred readily overhead by rotation of the vacuum wheel 140. Indexing unit 95 starts the rotation of the vacuum wheel 140 about the vacuum wheel shaft 131, causing the leading blank to move upward away from the rest of the stack while conforming to the configuration of the outer periphery of the vacuum wheel guide 142. Continued rotation of the vacuum wheel causes the upper edge of the blank to be fed into the nip formed by the upper and lower nip rollers, previously described, which cooperate to move the blank into the carton forming system. During this movement, the side edges of the blank are guided by the nips formed by the guide bars 185 and the downwardly extending ends of brackets 180.

Rotation of the wheel 140 about the vacuum wheel shaft 131 closes the valve 150 shown in position B in FIGURE 8. During rotation, the edge of the valve 150 adjacent vacuum wheel mounting bracket 129 contacts roller 138 mounted on deflection block 133, and the valve pivots about valve plate collar 147 to closed position B. At essentially the same time one valve reaches position B, another valve contacts the roller 139 on deflection block 134 and is pivoted to the open position denoted as A. Once the valve reaches the open position at A, a vacuum is drawn through the vacuum cup. After a rotation of essentially 120°, during which time open valve 150 travels from position A to position B, and is closed, the indexing unit stops the rotation with the next succeeding cup at approximately a right angle to the next succeeding blank and the entire sequence is repeated. As the vacuum wheel returns through a complete cycle each of the valves 150 is deflected or pivoted twice, once to open the valve (position A) and once to close it (position B). The valve shown in closed position B remains in that position for approximately 240° passing through closed position C until it again approaches deflection block 139. As the edge of the rotating valve contacts the roller 139 on the block 134, the valve is again pivoted to the open position A, thus providing a clear passage through which the vacuum is drawn away from the rest of the stack while conforming to the configuration of the outer periphery of the vacuum wheel guide 142. Continued rotation of the vacuum wheel causes the upper edge of the blank to be fed into the nip formed by the upper and lower nip rollers previously described, which cooperate to move the blank on into the carton forming system.

During this movement, the side edges of the blank are guided by the nips formed by the guide bars 185 and the downwardly extending ends of brackets 180.

Rotation of the wheel 140 about the vacuum wheel shaft 131 to position B shown in FIGURE 8 closes the valve 150 by contact with the roller 138 mounted on deflection block 133, the valve thereby pivoting into closed position about the valve plate collar 147. At essentially the same time that valve at position B is switched to a closed poistion, the valve at position A contacts the roller 139 on deflection block 134 and is thereby opened with a resulting vacuum being drawn through the vacuum cup. After a rotation of essentially 120° the indexing unit stops the rotation with the next succeeding vacuum cup at approximately a right angle to the next succeeding blank and the entire sequence is repeated. As the vacuum wheel turns through a complete cycle each of the valves 150 is deflected or pivoted twice, once to open the valve at position A and once to close it at position B. The valve shown in the closed position at B remains in that position for approximately 240° of the rotation, at which point it will have attained the position indicated by C, just approaching deflection block 139. As the edge of the valve denoted as B contacts the roller 139 on the block 134, the valve is again pivoted about the pivot collar 147 to the open position illustrated by the valve denoted as A in FIGURE 10, thus providing a clear passage through which the vacuum may be drawn.

The particular sequence of movements of the vacuum wheel, holding fingers and separating finger can best be understood by reference to FIGURES 18–21. FIGURE 18 shows the vacuum wheel cam 124 with the perimeter divided into a number of segments. The cam follower which travels in the track of the two edge positive action cam 124 controls the pivoting movement of the vacuum wheel assembly. As the cam follower, traveling along segment F toward A reaches A, the wheel pivots inwardly toward the stack stopping approximately one-eighth of an inch from the stack. Upon reaching B, the wheel moves in so that the vacuum cup contacts the blank and then upon reaching C the wheel moves out approximately an eighth of an inch. While the follower travels along segment D the wheel remains in the same position and then, as segment E is reached, the wheel moves out further. Upon the cam follower reaching segment F the wheel is at its greatest distance from the stack and remains there until the cam follower reaches segment A at which point the cycle is repeated.

Referring next to FIGURE 19 the sequence of movement of the upper holding fingers 127 is dictated by segments A–D of the cam 123. As the cam follower traveling along segment D reaches segment A the holding fingers move in to contact the leading blank and arrest the stack of carton blanks. During the time the cam follower travels along segment B the fingers remain in contact with the stack. After segment C is reached the fingers move out from the stack until D is reached, then during the time the follower traverses D the fingers remain out. When A is reached the cycle is again repeated.

Referring to FIGURE 20 the sequence of movements of the separating finger 86 is depicted. As the portion of the rocker arm 85 traveling on segment D reaches A the finger is forced down until the rocker arm reaches segment B at which point the finger remains in the same position while segment B is traversed. Upon reaching C the finger is elevated until segment D is reached. Then after D is reached the finger remains in the same position until D is traversed and the cycle begins again at segment A. All of the movements of the separation and withdrawal of the blanks are related in FIGURE 21 which is a relative motion diagram for the removal of a single blank. The areas denoted correspond to those of FIGURES 18–20. As is apparent the vacuum wheel 140, holding fingers 127 and separating finger 86 are in a dwell time of inactivity as the vacuum wheel rotates transferring the blank to the nip rollers.

Now that the construction and operation of the attachment as a whole, and its component parts, have been fully explained, it will be understood that modifications may be made within the scope of the appended claims, and it is to be further understood that certain features and sub-combinations will be useful in other systems, though particularly well suited to the apparatus disclosed herein.

What is claimed is:

1. An automatic feeding device for feeding carton blanks stacked one behind the other on a supporting surface to a carton forming system, said device comprising a vacuum wheel having vacuum cups fixedly mounted on the perimeter thereof, said wheel being mounted to rotate and also move toward and away from the stack of carton blanks so as to move said cups successively into contact with the then leading carton blank to withdraw the blanks one at a time from the stack, means for controlling the application of a suction to said cups; means mounted to arrest and hold the stack at timed intervals; means for separating the upper portion of the leading blank from the remainder of the stack; and means for rotating said vacuum wheel so as to withdraw the leading blank from the remainder of said stack and transfer said leading blank to the carton forming system.

2. An automatic feeding device for feeding carton blanks stacked one behind the other on a supporting surface to a carton forming system, said device comprising a vacuum wheel having vacuum cups fixedly mounted on the perimeter thereof, said wheel being mounted to rotate and also move toward and away from the stack of carton blanks so as to move said cups successively into contact with the then leading blank to withdraw the blanks one at a time from the stack, means for controlling the application of a suction to said cups; means mounted to move into and out of contact with the leading blank at timed intervals to arrest and hold the stack; means for both separating the upper portion of the leading blank from the remainder of the stack and for supporting the remainder of the stack at timed intervals alternating with said arresting and holding means; and means for rotating said vacuum wheel so as to withdraw the leading blank from the remainder of said stack and transfer said blank to the carton forming system.

3. An automatic feeding device for feeding carton blanks stacked one behind the other on a supporting surface to a carton forming system, said device comprising a vacuum wheel having vacuum cups fixedly mounted on the perimeter thereof, said wheel being mounted to rotate and also to move toward and away from the stack of carton blanks so as to move said cups successively into contact with the then leading blank to withdraw the blanks one at a time from the stack, passages extending radially outward from the center of said wheel for applying a suction to each of said cups, a valve located in each of said passages for controlling the application of a suction to said cups; means mounted to move into and out of contact with the leading blank at timed intervals to arrest and hold the stack; means for separating the upper portion of the leading carton blank from the remainder of the stack; and means for rotating said vacuum wheel so as to withdraw the leading blank from the remainder of said stack and transfer said leading blank to the carton forming system.

4. An automatic feeding device for feeding carton blanks stacked one behind the other on a supporting surface to a carton forming system, said device comprising a vacuum wheel having vacuum cups fixedly mounted on the perimeter thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, valves located in each of said passages for controlling the application of a suction to said cups; deflection means mounted adjacent the periphery of the vacuum wheel; said valves being opened and closed by contact with the deflection means as the vacuum wheel rotates; means mounted to arrest and hold the stack at timed intervals; means for separating the upper portion of the leading blank from the remainder of the stack; and means for rotating said vacuum wheel so as to withdraw the leading blank from the remainder of said stack and transfer said leading blank to the carton forming system.

5. An automatic feeding device for feeding carton blanks stacked one behind the other on a supporting surface to a carton forming system, said device comprising a vacuum wheel having vacuum cups fixedly mounted on the periphery thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, a valve located in each of said passages for controlling the application of suction to said cups; means mounted to move into and out of contact with the leading blank at timed intervals to arrest and hold the stack; means for both separating the upper portion of the leading blank from the remainder of the stack and for supporting the remainder of the stack at timed intervals alternating with said arresting and holding means; and means for rotating said vacuum wheel so as to withdraw the leading blank from the remainder of said stack and transfer said blank to the carton forming system.

6. An automatic feeding device for feeding carton blanks stacked one behind the other on a supporting surface to a carton forming system, said device comprising a vacuum wheel having vacuum cups fixedly mounted on the periphery thereof, said wheel being mounted to rotate and also move toward and away from the stack of carton blanks so as to move said cups successively into contact with the then leading carton blank to withdraw the blanks one at a time from the stack, means for controlling the application of a suction to said cups; means constituting a spaced pair of fingers mounted to move into and out of contact with the leading blank at timed intervals to arrest and hold the stack; said fingers moving toward the stack at substantially the same time as the vacuum wheel to arrest and hold as one of the vacuum cups contacts the leading carton between said spaced fingers; means for both separating the upper portion of the leading blank from the remainder of the stack and for supporting the remainder of the stack at timed intervals alternating with said arresting and holding means; said separating means seating behind the leading blank when the vacuum wheel moves away from said stack and supporting said stack when said fingers move out of pressure contact with the stack; and means for rotating said vacuum wheel so as to withdraw the leading blank from the remainder of said stack and transfer said leading blank to the carton forming system.

7. An automatic feeding device for feeding carton blanks stacked one behind the other on a feed table to a carton forming system, said device comprising means for moving the stack forward; a vacuum wheel having vacuum cups fixedly mounted on the periphery thereof substantially perpendicular to the plane of said wheel, which plane is substantially perpendicular to the plane of each of the carton blanks, said wheel being mounted to rotate and also move toward and away from the stack of carton blanks so as to move said cups successively into contact with the then leading carton blank to withdraw the blanks one at a time from the stack, means for controlling the application of a suction to said cups; means mounted to arrest and hold the stack at timed intervals, means for separating the upper portion of the leading blank from the remainder of the stack; and means for rotating said vacuum wheel so as to withdraw the leading blank from the remainder of said stack and transfer said leading blank to the carton forming system.

8. An automatic feeding device for feeding carton blanks stacked one behind the other on a feed table to a carton forming system, said device comprising means for moving the stack forward; means responsive to the forward pressure of the stack for regulating the forward movement of the stack; a vacuum wheel having vacuum cups fixedly mounted on the periphery thereof, said wheel being mounted to rotate and also move toward and away from the stack of carton blanks so as to move said cups successively into contact with the then leading carton blank to withdraw the blanks one at a time from the stack; means for controlling the application of a suction to said cups; means mounted to arrest and hold the stack at timed intervals; means for separating the upper portion of the leading blank from the remainder of the stack; and means for rotating said vacuum wheel so as to withdraw the leading blank from the remainder of said stack and transfer said leading blank to the carton forming system.

9. An automatic feeding device for feeding carton blanks stacked one behind the other on a feed table to a carton forming system, said device comprising means for moving the stack forward; means responsive to the forward pressure of the stack for regulating the forward movement of the stack; a vacuum wheel having vacuum cups fixedly mounted on the periphery thereof substantially perpendicular to the plane of said wheel, which plane is substantially perpendicular to the plane of each of the carton blanks, said wheel being mounted to rotate and also move toward and away from the leading carton blank so as to move said cups into contact with the leading and the immediately following blanks successively so as to withdraw them one at a time from said stack, passages extending radially outward from the center of said wheel for applying a suction to each of said cups, a valve located in each of said passages for controlling the application of a suction to said cups; means mounted to move into and out of contact with the leading and immediately following blanks of said stack to arrest and hold the stack at timed intervals; means for both separating the leading and immediately following blanks one at a time from the remainder of the stack and for supporting the remainder of said stack at timed intervals alternating with said arresting and holding means; and means for rotating said vacuum wheel so as to withdraw the leading blank from the remainder of said stack and transfer said leading blank to the carton forming system.

10. An automatic feeding device for feeding carton blanks stacked one behind the other on a feed table to a carton forming system, said device comprising means for moving the stack forward; means responsive to the forward pressure of the stack for regulating the forward movement of the stack; a vacuum wheel having vacuum cups fixedly mounted on the perimeter thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, a valve located in each of said passages for controlling the application of a suction to said cups; means mounted to arrest and hold the stack at timed intervals; means for separating the upper portion of the leading blank from the remainder of the stack; and means for rotating said vacuum wheel so as to withdraw the leading blank from the remainder of said stack and transfer said leading blank to the carton forming system.

11. An automatic feeding device for feeding carton blanks stacked one behind the other on a feed table to a carton forming system, said device comprising means for moving the stack forward; means responsive to the forward pressure of the stack for regulating the forward movement of the stack; vacuum wheel having vacuum cups fixedly mounted on the periphery thereof, said wheel being mounted to rotate and also move toward and away from the stack of carton blanks so as to move said cups successively into contact with the then leading carton blank to withdraw the blanks one at a time from the stack; means for controlling the application of a suction to said cups; means mounted to move into and out of contact with the leading blank at timed intervals to arrest and hold the stack; means for both separating the upper portion of the leading blank from the remainder of the stack and for supporting the remainder of the stack at timed intervals alternating with said arresting and holding means; and means for rotating said vacuum wheel so as to withdraw the leading blank from the remainder of said stack and transfer said blank to the carton forming system.

12. An automatic feeding device for feeding carton blanks stacked one behind the other on a feed table to a carton forming system, said device comprising means for moving the stack forward; means responsive to the forward pressure of the stack for regulating the forward movement of the stack; a vacuum wheel having vacuum cups fixedly mounted on the perimeter thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, a valve located in each of said passages for controlling the application of a suction to said cups; means mounted to move into and out of contact with the leading blank at timed intervals to arrest and hold the stack; means for separating the upper portion of the leading carton blank from the remainder of the stack; and means for rotating said vacuum wheel so as to withdraw the leading blank from the remainder of said stack and transfer said leading blank to the carton forming system.

13. An automatic feeding device for feeding carton blanks stacked one behind the other on a feed table to a carton forming system, said device comprising means for moving the stack forward; means responsive to the forward pressure of the stack for regulating the forward movement of the stack; a vacuum wheel having vacuum cups fixedly mounted on the perimeter thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, a valve located in each of said passages for controlling the application of suction to said cups; deflection means mounted adjacent the periphery of the vacuum wheel; said valves being opened and closed by contact with the deflection means as the vacuum wheel rotates; means mounted to arrest and hold the stack at timed intervals; means for separating the upper portion of the leading blank from the remainder of the stack; and means for rotating said vacuum wheel so as to withdraw the leading blank from the remainder of said stack and transfer said leading blank to the carton forming system.

14. An automatic feeding device for feeding carton blanks stacked one behind the other on a feed table to a carton forming system, said device comprising means for moving the stack forward; means responsive to the forward movement of the stack; a vacuum wheel having vacuum cups fixedly mounted on the periphery thereof, said wheel being mounted to rotate and also move toward and away from the stack of carton blanks so as to move said cups successively into contact with the then leading carton blank to withdraw the blanks one at a time from the stack, passages extending radially outward from the center of said wheel for applying a suction to each of said cups, valves located in each of said passages for controlling the application of a suction to said cups; deflection means mounted adjacent the periphery of the vacuum wheel; said valves being opened and closed by contact with the deflection means as the vacuum wheel rotates; means mounted to move into and out of contact with the leading blank at timed intervals to arrest and hold the stack; means for both separating the upper portion of the leading blank from the remainder of the stack and for supporting the remainder of the stack at timed intervals alternating with said arresting and holding means; and means for rotating said vacuum wheel so as to withdraw the leading blank from the remainder of said stack and transfer said blank to the carton forming system.

15. In an automatic feed device for carton blanks stacked one behind the other, a vacuum wheel having vacuum cups fixedly mounted on the periphery of said wheel and being mounted to rotate, passages extending radially outward from the center of said wheel for applying a suction to each of said cups, valves located in each of said passages for controlling the application of a suction to said cups, deflection means mounted adjacent the periphery of the vacuum wheel, said valves being opened and closed by contact with the deflection means as the vacuum wheel rotates.

16. In an automatic feed device for carton blanks stacked one behind the other, a vacuum wheel having vacuum cups fixedly mounted on the periphery of said wheel and being mounted on a shaft suspended by a pair of pivoting arms to rotate and also move toward and away from the stack of carton blanks so as to move said cups successively into contact with the then leading carton blank to withdraw the blanks one at a time from the stack, passages extending radially outward from the center of said wheel for applying a suction to each of said cups; valves located in each of said passages and extending beyond the confines of the vacuum wheel for controlling the application of a suction to said cups, deflection blocks mounted on the pivoting arms adjacent the periphery of the vacuum wheel, said valves being opened and closed by the contact with the deflection blocks as the vacuum wheel rotates.

17. A method for separating the leading carton blank from carton blanks stacked one behind the other which comprises advancing said stack of cartons towards an arresting means comprising a spaced pair of elements, arresting said advance by contacting the leading blank with said spaced elements, contacting the leading blank intermediate the spaced elements with a suction means and partially retracting said suction means to form a bowed portion in said blank between said elements, seating a retaining means behind the bowed portion of said leading blank to separate the upper portion of said leading blank from the remainder of the stack and to support said stack, withdrawing said holding means from pressure contact with said stack and then transferring said separated blank by movement of said suction means.

18. A method for separating the leading carton blank from carton blanks stacked one behind the other which comprises advancing said carton blanks toward a deflectable holding means, controlling said advance by means responsive to the pressure of said advancing carton blanks transmitted from said deflectable holding means, arresting the stack of said blanks by contacting the leading blank with means comprising a spaced pair of elements, contacting the leading blank intermediate said spaced elements with a suction means and partially retracting said suction means to form a bowed portion in said leading blank between said elements, seating a retaining means behind the formed portion of said leading blank to separate the upper portion of said blank from the remainder of the stack and to support said stack, withdrawing said arresting means from pressure contact with said stack and then transferring said separated blank by movement of said suction means.

References Cited by the Examiner

UNITED STATES PATENTS

| | | |
|---|---|---|
| 1,429,095 | 9/22 | Peters et al. |
| 1,920,001 | 7/33 | Chambers _____ 271—27 |
| 2,138,306 | 11/38 | Patrick. |
| 2,161,866 | 6/39 | Huckins _____ 271—27 |
| 2,325,774 | 8/43 | Hohl _____ 271—28 X |
| 2,693,957 | 11/54 | Welsh. |
| 2,714,006 | 7/55 | Layden _____ 271—28 |
| 2,847,213 | 8/58 | Duncanson et al. |
| 2,918,279 | 12/59 | Jackson _____ 271—28 |
| 2,956,801 | 10/60 | Coakley _____ 271—28 X |

ROBERT B. REEVES, *Primary Examiner.*

SAMUEL F. COLEMAN, *Examiner.*